United States Patent [19]
Fritzinger et al.

[11] 3,752,909
[45] Aug. 14, 1973

[54] SYNC PULSE DEFEAT SWITCH

[75] Inventors: Dale A. Fritzinger, Portsmouth; Robert H. Newman, Norfolk, both of Va.

[73] Assignee: General Electric Company, Portsmouth, Va.

[22] Filed: Sept. 30, 1971

[21] Appl. No.: 185,191

[52] U.S. Cl...... 178/7.3 R, 178/7.5 R, 178/69.5 TV, 325/417
[51] Int. Cl. .............................................. H04n 5/44
[58] Field of Search.................... 178/7.3 R, 5.8 AF, 178/69.5 TV; 325/417

[56] References Cited

UNITED STATES PATENTS 3,308,382 3/1967 Vo Dinh Hein .................... 325/417

*Primary Examiner*—Richard Murray
*Attorney*—Stanley C. Corwin et al.

[57] ABSTRACT

Switch means are provided in a circuit for defeating the application of sync pulses simultaneously with the adjustment of a horizontal oscillator. The switch comprises a pair of upstanding conductive elements disposed adjacent one end of a slug-tuned coil. Adjusting means operable from without the receiver cabinet extend through the slug-tuned coil to the vicinity of the switch elements. The adjusting means are pushed inwardly from without the receiver cabinet to cause the switch to close, defeating the sync pulses. While in this extended position the adjusting means may be turned to modify the characteristics of the slug-tuned coil, while operation of the oscillator circuit continues unhampered by the presence of sync pulses.

2 Claims, 2 Drawing Figures

SYNC PULSE DEFEAT SWITCH

BACKGROUND OF THE INVENTION

The present invention relates to adjusting means for electrical circuitry and, more particularly, to means which facilitate the disabling of a first portion of an electrical circuit simultaneously with the adjustment of a second portion.

In adjusting certain portions of electrical and electronic devices, it is sometimes necessary to disable one circuit or portion thereof in order to facilitate the adjustement of another portion. For instance, in many conventional television receivers there is provided an oscillator for producing pulses which effect the deflection of an electron beam across the face of a cathode ray tube. In particular, one such oscillator is commonly used to produce a signal which effects the horizontal deflection of the beam. Such an oscillator, commonly denominated a horizontal oscillator, is adapted to operate in two modes; a first mode, when no video signal is received, and commonly termed a free running mode; and a second mode which occurs when a signal is being received, termed the synchronized mode. When a video signal is received, synchronizing or "sync" pulses are abstracted from the video signal and applied to the horizontal oscillator for causing the horizontal deflection signals to occur in synchronism with the received signal. However, when no video signal is being received it is still necessary to repeatedly deflect the electron beam across the cathode ray tube face in order to avoid injuring the phosphor coating thereon.

While the horizontal oscillator could theoretically operate at various frequencies during the free-running mode it is highly desirable to constrain the free running frequency to approximate as closely as possible the synchronized frequency. Thus, when receiving sync pulses the oscillator is running as close to its natural frequency as possible. However, in order to facilitate the proper adjustment of the free-running frequency it is desirable to make the adjustment while a video signal is being received. To perform this operation the sync pulses must somehow be defeated, or prevented from reaching the horizontal oscillator, while the adjustment is made. This is commonly accomplished by shorting a segment of the synchronizing circuitry to ground.

In order to obtain access to the synchronizing circuitry it is ordinarily necessary to remove the back portion of the television receiver cabinet, although means to accomplish the necesary adjustment of the horizontal oscillator is commonly provided exterior to the enclosure. While it is possible to provide a separate sync defeat switch operable from outside the cabinet the provision of such a separate switch would add to the expense of constructing the receiver, and moreover might accidently be operated by unauthorized personnel. It will therefore be appreciated that it would be desirable to provide simple, inexpensive means for defeating sync pulses during the adjustement of the oscillator.

It is therefore an object of the present invention to provide switch means for disabling a first portion of an electrical circuit while adjusting a second portion thereof.

It is a further object of this invention to provide means for simultaneously adjusting one portion of a circuit disposed within an enclosure and defeating another portion, without the necessity of gaining access to the interior of the enclosure.

It is another object of this invention to provide a single adjusting means adapted to defeat a first portion of an electrical circuit, and adjust a second portion thereof.

SUMMARY OF THE INVENTION

Briefly stated, in accordance with one aspect of the invention, the foregoing objects are achieved by providing adjustable circuit means having an aperture therein for slidably receiving a rod-like adjusting means. Switch means are disposed near the adjustable circuit means so that upon slidably moving the adjusting means through the aperture, the switch is operatively engaged by the adjusting means. While in this position, the adjusting means is rotated to modify the characteristics of the adjustable circuit means. In a preferred embodiment the adjustable circuit means comprises a slug-tuned inductor, and the switch means a pair of upstanding conductive elements aligned with an aperture in the magnetic slug or core of the inductor. A non-magnetic, elongate adjusting means extends through the aperture to maintain the switch in a closed position while the adjusting means is rotated to displace the core, varying the value of the inductor.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF THE PREFERRED EMBODIMENT

Figure 1:
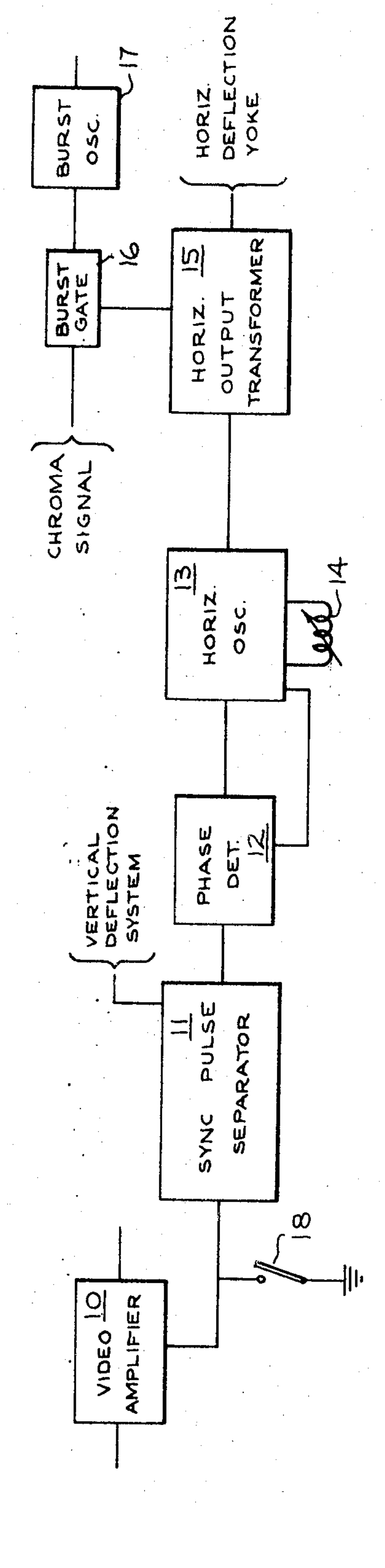
FIG. 1 is an idealized diagram showing certain elements of a television receiver circuit.

FIG. 1 shows selected elements of a television receiver, including a video amplifier 10 which applies a signal to subsequent signal processing circuitry (not shown), and to the input terminal of a sync pulse separator 11. Signals outputted by sync pulse separator 11 are applied to a vertical deflection system (not shown) and to a phase detector 12. A horizontal oscillator 13 provides periodic pulses which are fed back to phase detector 12 and compared with the output of sync pulse separator 11. The signal outputted by phase detector 12 is applied to horizontal oscillator 13 in order to constrain the oscillator output to remain in phase with pulses produced by sync pulse separator 11.

The free-running frequency of horizontal oscillator 13 is adjusted by means of a variable inductor 14. The value of inductor 14 is varied by turning a slug or core threadedly disposed within the inductor winding. Pulses produced by the oscillator 13 are applied to a primary winding of a horizontal output transformer 15 in a manner well known to those skilled in the art. The transformed signal which results is then applied in the usual fashion to a horizontal deflection yoke (not shown). Further, horizontal signals thus obtained are applied to a burst gate 16 in combination with a signal derived from a chroma signal processing stage (not shown) which includes a burst or synchronizing signal. As is familiar to those skilled in the art, gate 16 is enabled by the presence of pulses produced by horizontal output transformer 15 at the proper time to allow the burst portion of the chroma signal to be applied to a burst oscillator 17. The burst signal produced thereby is then utilized to effect proper demodulation of the chroma signal.

In order to cause the system to operate at its greatest effectiveness, it will be recognized that the free-running frequency to which the horizontal oscillator 15 is tuned should be as close as possible to the frequency of the sync pulses provided by sync pulse separator 11. Otherwise, oscillator 15 would be driven by the sync pulses at a frequency to which it is not tuned and therefore operate inefficiently. In addition, despite the presence of phase detector 12 the oscillator may produce pulses slightly ahead of or behind the incoming sync pulses and thus operate burst gate 16 at an inopportune time, with the resulting detrimental effects upon the tint or hue of a color image displayed by the receiver.

In order to facilitate the proper adjustment of the horizontal oscillator it is highly desirable that a video signal be received, so that the effect of oscillator adjustment upon the displayed image may be observed. During this procedure, it is necessary to prevent pulses produced by sync pulse separator 11 from being applied to the phase detector 12 so that horizontal oscillator 13 may attain its natural free-running frequency. To this end, sync pulse separator 11 is commonly disabled by shorting the input terminal thereof to ground.

A sync pulse defeat switch 18 is shown connected to shunt pulses applied to the sync pulse separator 11 to ground, in order to allow the horizontal oscillator 13 to attain its free-running mode. It will be understood, however, that the elimination of sync pulses may be accomplished through means other than the idealized switch shown at 18. Sync pulse defeat is commonly achieved during the servicing of a receiver by utilizing a conductive object, such as a screwdriver shank, to shunt an input terminal of the sync pulse separator 11 to ground. Any suitable switch means, however, might be used to disable the sync pulse separator circuit; further, the idealized switch shown may be placed directly in series between the video amplifier 10 and the sync pulse separator 11 and opened to disconnect them.

In operation, a video signal derived from video amplifier 10 is applied to the input terminal of the sync pulse separator 11. The separator, herein treated as including the electronic device utilized for actual separation along with the circuitry associated therewith, abstracts the synchronizing pulse portion of the video signal and transfers it to a vertical deflection system and to a phase detector 12. The sync pulses which are abstracted and transferred to phase detector 12 are intended to effect the horizontal sweep of an electron beam across the face of a cathode ray tube in synchronism with received signals. Video information transmitted between the sync pulses modulates the electron beam and produces a portion of a displayed image. It is therefore necessary that the modulated beam be deflected at exactly the right point in time for providing a coherent, acceptable displayed image. Further, in color television receivers the synchronism of horizontal oscillator pulses with a received video signal is even more crucial due to the fact that the demodulation of the chroma portion of the signal is a function of the phase of the synchronizing or burst signals produced by burst oscillator 17. Should signals produced by the horizontal oscillator be applied to the burst gate 16 too early or too late, portions of the video signal other than the burst signal will be transferred through gate 16 to the burst oscillator 17. If portions of the video signal preceding or following the burst signal invade the burst oscillator 17, the phase of the signal outputted by the oscillator will change slightly. This upsets the chroma demodulation process with the result that the hue of the displayed image undergoes an undesirable change. It will therefore be appreciated that horizontal oscillator 15 must operate in synchronism with the video signal, and thus with the sync pulses derived therefrom, as closely as possible.

While the horizontal oscillator 15 may be constrained to operate in close synchronism with pulses supplied by sync pulse separator 10, it is necessary that the oscillator also be capable of running free at a predetermined frequency in the absence of sync pulses. For instance, when a receiver is "between channels" and no sync pulses are produced it is necessary to continue deflecting the electron beam to avoid injuring the picture tube. For this reason, horizontal oscillator 15 is constructed with the capability of producing pulses at substantially the desired horizontal rate in the absence of sync pulses. Adjustable means such as variable inductor 14 are provided within the oscillator to adjust the free-running frequency thereof.

While means for adjusting the variable inductor 14 of horizontal oscillator 13 are commonly provided externally of the receiver the sync separator 11 is inaccessible from without the receiver cabinet. The cabinet must therefore be opened, usually by removing a rear panel, and means for disabling the sync separator must be applied to the circuit within the receiver. Of course, it is quite possible to provide a separate switch for accomplishing this operation, and to mount the switch so that it is accessible from without the receiver cabinet. However, it will be appreciated that the provision of a suitable switch adds to the expense of producing a receiver; and, moreover, it would be accessible to untrained personnel or to children who might inadvertently operate the switch with the resulting detrimental effect upon the displayed image. The present invention avoids these problems by providing means for simultaneously defeating the sync pulses while adjusting the horizontal oscillator through inexpensive means which are unlikely to be operated by untrained personnel.

Figure 2:
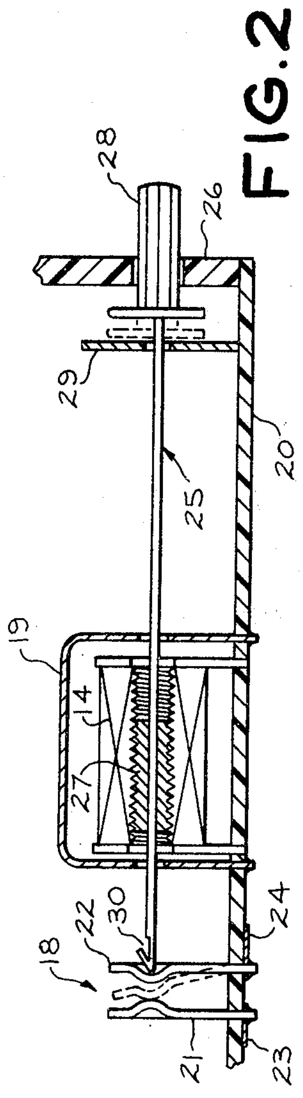
FIG. 2 is a partly sectioned elevational view of a preferred embodiment of the invention.

Referring now to FIG. 2, there is shown a partially sectioned elevational view of certain of the elements represented schematically in FIG. 1. The adjustable inductor 14 is enclosed by shielding means 19 and is mounted upon a supporting element such as a circuit board 20, which is in turn supported by the chassis of the television receiver (not shown). A sync pulse defeat switch 18 advantageously comprises a first, upstanding conductive member 21 and a juxtaposed flexible conductive member 22. Switch member 21 is coupled to ground by soldering it to a conductive lead 23 printed upon circuit board 20. Similarly, resilient switch member 22 is soldered to another printed lead 24 formed on the circuit board which communicates with an input terminal of a sync pulse separator.

Threadedly disposed within inductor 14 is a magnetic core 27. Core 27 is provided with an aperture extending axially therethrough for receiving an adjusting means. This aperture is commonly of a non-circular cross-section, such as a hexagon, so that the core will rotate with adjusting means inserted therein. While the hexagonal configuration of the aperture serves to constrain core 27 to rotate with an inserted adjusting means, the adjusting means may be moved axially through the aperture with little impediment. It is therefore contemplated that the configuration of the adjusting means to be used will be such as to rotatably engage the aperture of threaded core 27, while sliding easily therethrough.

Inductor 14 is oriented so that the aperture in core 27 is substantially axially aligned with switch member 22. Elongate adjusting means 25 are provided, one end of which extends through the aperture of core 27 in close proximity with switch member 22. The opposite end of adjusting means 25 terminates in a handle or knob portion 28 adapted to be manually manipulated.

An enclosure 26 is provided about the circuitry and has an opening formed therein to allow knob portion 28 to extend therethrough. Positioned within enclosure 26, and substantially parallel thereto, is an upstanding resilient member 29 which may be of a flexible insulating material, such as fish paper. Resilient member 29 serves to limit the insertion of adjusting means 25 by abutting the inner end of knob 28.

The inner end 30 of adjusting means 25 is of a reduced diameter, and bent backward upon itself in a manner of a hook or barb. End 30 may thus be inserted in the aperture of core 27 with little impediment thereto, the barb springing outwardly after its passing through the aperture to prevent withdrawal of the adjusting means.

As indicated by the dotted lines, further extension of the adjusting means through the aperture of threaded core 27 will bring the barb at the inner end 30 of the adjusting means into contact with flexible switch member 22, biasedly forcing member 22 against the juxtaposed switch member 21. As set forth above, contact between the switch members closes a circuit to defeat sync pulses which would otherwise be applied to a phase detector. Closure of the contacts may be easily accomplished by manual pressure upon the knob 28 formed at the outer end of adjusting means 25.

While the configuration of switch memers 21 and 22 may be varied, a concave depression may advantageously be formed in the upper portion of switch member 22 to receive the inner end of adjusting means 25 while maintaining its alignment with the aperture of core means 27. It may further be possible to form switch memers 21 and 22 in a common configuration to avoid the extra expense involved in constructing a second, different switch member. Further, the depressions form convex surfaces on confronting sides of the switch members which serve to compensate for misalignment between the members.

It will be seen that the outer end of the adjusting means terminates in a knob 28 formed in a configuration which may be easily manipulated without the use of special tools. Pressure upon knob 28 moves the adjusting means inwardly to close switch 18, defeating the sync pulses and allowing the horizontal oscillator to attain its natural free-running frequency. While in this position, the adjusting means 25 may be rotated one way or the other to advance core means 27 within conductor 14. In this manner the free-running frequency of the horizontal oscillator may be changed until it attains a frequency equivalent to that of the received sync pulses, as evidenced by the configuration of the image displayed upon the face of the picture tube of the receiver. After this tuning has been accomplished, the adjusting means 25 is released and the natural bias provided by flexible switch member 22 in conjunction with that of the resilient insulating element 29 forces the adjusting means outwardly. Switch 18 is now allowed to open so that sync pulses are reapplied to the horizontal oscillator.

As will be evident from the foregoing description, certain aspects of the invention are not limited to the particular details of the examples illustrated. For instance, the embodiment shown in FIG. 2 may be easily modified so that switch 18 is closed by a partial withdrawal of adjusting means 25, rather than a further insertion thereof. Further, it may be desirable to engage switch 18 by other portions of adjusting means 25, such as an abutment or land formed elsewhere upon the adjusting means. Again, the circuit may be so constructed that opening, rather than closing, the switch serves to defeat the sync pulses. It is accordingly intended that the appended claims shall cover all such modifications and applications as do not depart from the true spirit and scope of the invention.

We claim:

1. In a television receiver, means for preventing the application of sync pulses to an oscillator while the free running frequency of the oscillator is being adjusted comprising:

inductor means in circuit with said oscillator for controlling the free-running frequency thereof, said inductor means having a magnetic core rotatably mounted therein for varying the inductance thereof, said core having an aperture for receiving an adjusting member, switch means coupled to said source of sync signals to control the application thereof to said oscillator, said switch means being aligned adjacent said aperture, an adjusting member engaged with said aperture for rotating said core and engageable with said switch means upon axial movement thereof to prevent application of sync pulses to said oscillator during adjustment of the position of said core, and bias means resisting axial movement of said adjusting member such that said adjusting member engages said switch means only during manual manipulation thereof.

2. The invention recited in claim 1 wherein said aperture extends axially through said core and is of noncircular cross-section permitting axial movement of said adjusting member relative to said core while preventing relative rotational movement.

* * * * *